Jan. 17, 1950  G. B. LINDERMAN, III  2,494,566
APPARATUS FOR PRODUCING ARTIFICIAL
RADIO DIRECTION SIGNALS
Filed April 3, 1943
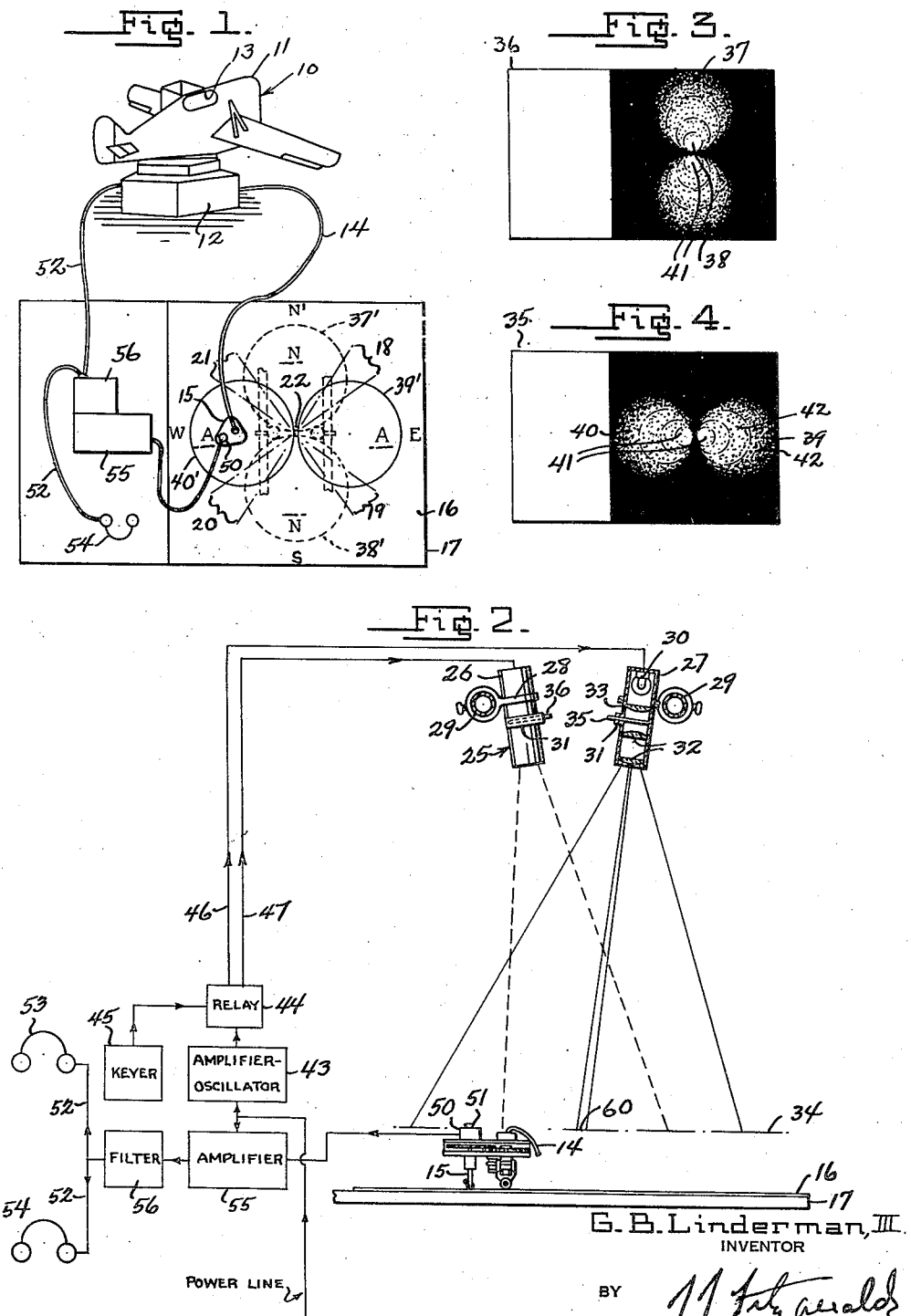
G. B. Linderman, III
INVENTOR Patented Jan. 17, 1950

2,494,566

UNITED STATES PATENT OFFICE 2,494,566

APPARATUS FOR PRODUCING ARTIFICIAL RADIO DIRECTION SIGNALS

Garrett B. Linderman, III, United States Navy

Application April 3, 1943, Serial No. 481,701

4 Claims. (Cl. 35—10.2)

(Granted under the act of March 3, 1883, as amended April 30, 1928; 370 O. G. 757)

The invention relates to improvements in flight training equipment and apparatus for producing artificial radio direction signals.

The primary object of the invention is the provision of means to simulate radio aids to aerial navigation.

Another object of the invention is to provide means for use in conjunction with an aviation training device, such as the Link trainer, and which will automatically furnish a student operating the training device with signals simulating the conventional radio direction signals that are received by an aircraft in flight.

A further object of the invention is the provision of a signalling system having an optical connection in lieu of a radio connection.

A still further object of the invention lies in the provision of a signalling system having an optical connection which is not susceptible to interference from other signalling systems or from outside sources of light.

Other objects and advantages of the invention will become apparent during the course of the following detailed description, taken in connection with the accompanying drawing, forming a part of this specification, and in which drawing, Figure 1 is a view partly in top plan and partly in perspective of the improved signalling system associated with a conventional aviation training device.

Figure 2 is a view, partly diagrammatic and partly in front elevation, showing the signalling system.

Figures 3 and 4 are plan views of transparencies preferably forming a part of the signalling system.

In the drawing, which for the purpose of illustration shows only a preferred form of the invention, and wherein similar reference characters denote corresponding parts throughout the several views, the numeral 10 generally designates a suitable aviation training device, such as the Link trainer disclosed in United States Patents 1,825,462 and 2,099,857. This trainer 10 includes an airplane 11 universally mounted on a base 12 and provided with the usual mechanism (not shown) whereby a student seated in the cockpit 13 may control the attitude of the airplane. Electrically connected to the base 12 as by a cable 14 is a recorder 15, such as shown and described in the Link Patent 2,179,663, adapted to move over a chart 16 on a table top 17, in a direction depending on the orientation of the airplane. This chart 16 is provided with delineations 18, 19, 20 and 21 defining a typical arrangement of directional radio beams such as would be emitted from a radio station at 22 on the chart. Lying between the beams 18, 19, 20 and 21 are quadrants E and W within which the Morse code dot-dash signal for the letter A is ordinarily received, and quadrants N' and S wherein the Morse code dash-dot signal for the letter N is usually received, these A and N signals overlapping along the beams 18, 19, 20 and 21 to produce a continuous signal.

In Figure 2 is shown the signalling means 25 which includes a pair of tubular light projectors 26, 27 adjustably secured above the chart 16, as by brackets 28 and frame 29. Each of these light projectors 26, 27 includes an upper and portion containing a neon lamp 30, an intermediate portion providing a slideway 31, and an open lower end portion containing a projection lens system 32. A condensing lens 33 may be interposed between the lamp 30 and the slideway 31. In order to produce a definite pattern of light in the focal plane 34 above the recorder 15 and chart 16, transparent films or plates 35, 36 are disposed in the slideways 31. Extending transversely of the plate 36 are slightly spaced substantially circular areas 37, 38 permitting the passage of light to zones 37', 38' over the quadrants N' and S of the chart, the transparency of the areas 37, 38 varying so that the intensity of the light focused in the zones 37', 38' will vary in a manner similar to variations in field strength of a directional radio signal. The plate 35 is provided with longitudinally extending slightly spaced circular areas 39, 40, permitting the passage of light to the zones 39', 40' over the quadrants E and W of the chart. These areas 37—40 may each include a relatively small highly transparent circular spot 41 inwardly of a series of gradually less transparent arcuate segments 42 which merge together imperceptibly, the outer or least transparent segment merging into substantially opaque areas which surround the transparent areas 37—40.

Shown diagrammatically in Figure 2 is means for alternately energizing the lamps 30 in the projectors 26, 27 to produce short and long flashes of light corresponding to the dot-dash and dash-dot of the letters A and N. The amplifier-oscillator 43 supplies a relay 44 with electric current of a suitable frequency, the relay 44 being controlled by a keyer 45 which alternately makes and breaks the circuits 46, 47 whereby to transmit the letters A and N to the projectors 26 and 27 respectively.

Mounted on the recorder 15 is a photo-electric cell 50 having an upwardly facing light inlet 51 disposed substantially in alignment with the focal plane 34 of the projectors 26, 27. Interposed between the photo-electric cell and the student's and instructor's headphones 53, 54 is an amplifier 55 and filter 56 which tends to eliminate current of a frequency differing from that of the oscillator 43.

During the operation of the flight training equipment by the student, the recorder 15 automatically moves across the chart 16 in a direction depending on the orientation of the airplane being simulated. Assuming the recorder to be positioned in the W quadrant as shown in Figure 1, the projector 27 will direct flashes of light corresponding to the A signal into the photo-electric cell 50 which controls the operation of the headphones. Thus, the student is furnished dot and dash signals simulating the conventional radio direction signals. Should the student turn toward or away from the station 22, the signal volume will increase or decrease as the recorder 15 moves into zones where the light intensity is greater or less. Upon approaching one of the beams 18—21, the A and N signals will be heard as a continuous hum due to the combined action of the alternate flashes of light from the projectors 26, 27. As the recorder 15 passes over the station 22, the photo-electric cell 50 will enter a dark zone 60 surrounded by the four spaced lighted zones 37', 38', 39' and 40'. This will cause the signals to fade out in a manner similar to that of conventional radio direction signals at the time an aircraft is passing over the station. It will, therefore, be understood that my improved signalling system relieves the instructor of the duty of constantly observing the position of the student as indicated by the recorder and communicating this information to the student.

Various changes may be made in the form of invention herein shown and described without departing from the spirit of the invention or the scope of the following claims.

The invention described herein may be manufactured and/or used by or for the Government of the United States of America for governmental purposes without the payment of any royalties thereon or therefor.

What is claimed is.

1. The combination with an aviation training device which includes a remotely located position indicating carriage movable responsive to operation of the training device by a student, of means producing flashes of light corresponding in spacing and duration to conventional radio direction signals, means projecting said light in overlapping patterns of variable intensity over the area in which said carriage is movable, photoelectric means attached to the carriage for producing an electric current during the period of said flashes and of a strength depending on the intensity of the light received by said photoelectric means, and signal means in said training device operated by said electric current.

2. The combination with an aviation training device which includes a remotely located position recorder movable responsive to operation of the training device by a student, of means producing flashes of modulated light, said flashes corresponding in spacing and duration to conventional radio direction signals, means producing patterns of said light, the intensity of said patterns varying in accordance with variations in field strength of said radio direction signals, means projecting said patterns over the area in which said recorder is movable in overlapped relationship, photo-electric means secured to the recorder for producing an electric current having characteristics depending on the characteristics of the light received by photo-electric means, a filter for eliminating from said electric current any frequencies differing from the frequency of said modulated light, and signal means in said training device operated by said current.

3. The combination with an aviation training device which includes a remotely located position indicator movable responsive to operation of the training device by a student, of individual means projecting light into adjacent overlapping zones in a common focal plane of the light projecting means parallel to which said position indicator is movable, means alternately operating said individual light projecting means to produce flashes of light in said adjacent overlapping zones corresponding in spacing and duration to conventional radio code signals, photo-electric means secured to the position indicator and traversing said focal plane for receiving flashes of light from at least one of said individual light projecting means depending on the location of the position indicator, and signal means controlled by said photo-electric means in said training device.

4. The combination with an aviation training device of the type which includes a remotely located position recording carriage movable responsive to operation of the training device by a student, a pair of light projectors directed toward the recording carriage and having a substantially common focal plane above the recording carriage, said projectors including light sources, electrical circuits in which the light sources are connected, said circuits embodying a common keyer for alternately energizing said light sources to produce flashes of light, means producing patterns of zones of varying intensity in said light, said projectors being inclined toward each other so that the patterns overlap in said focal plane, photo-electric means mounted on the recording carriage to traverse the focal plane for producing an electric current having characteristics depending on the characteristics of the light received by the photo-electric means, and signal means in said training device operated by said current.

GARRETT B. LINDERMAN, III.

REFERENCES CITED

The following references are of record in the file of this patent:

UNITED STATES PATENTS

| Number | Name | Date |
| --- | --- | --- |
| 2,099,857 | Link | Nov. 23, 1939 |
| 2,165,236 | Dewan | July 11, 1939 |
| 2,199,066 | Bernstein | Apr. 30, 1940 |
| 2,227,147 | Lindsay | Dec. 31, 1940 |
| 2,240,800 | Rigert | May 6, 1941 |
| 2,243,600 | Hulst | May 27, 1941 |
| 2,312,962 | DeFlorez | Mar. 2, 1943 |
| 2,326,764 | Crane | Aug. 17, 1943 |
| 2,366,603 | Dehmel | Jan. 2, 1945 |
| 2,451,927 | Dehmel | Oct. 19, 1948 |
| 2,454,503 | Crane | Nov. 23, 1948 |